United States Patent
Boeckel et al.

(10) Patent No.: US 7,085,471 B2
(45) Date of Patent: Aug. 1, 2006

(54) LIGHT BARRIER

(75) Inventors: Guenter Boeckel, Waldkirch (DE); Ralf Friedrich, Buggingen (DE); Christof Meyer, Gutach (DE); Martin Wuestefeld, Sexau (DE)

(73) Assignee: Sick AG, Waldkirch (DE)

( * ) Notice: Subject to any disclaimer, the term of this patent is extended or adjusted under 35 U.S.C. 154(b) by 0 days.

(21) Appl. No.: 11/078,837

(22) Filed: Mar. 10, 2005

(65) Prior Publication Data

US 2005/0207724 A1  Sep. 22, 2005

(30) Foreign Application Priority Data

Mar. 16, 2004  (DE)  ............... 10 2004 012 794

(51) Int. Cl.
*G02B 6/00*  (2006.01)

(52) U.S. Cl. ..................................... 385/147

(58) Field of Classification Search ............... None
See application file for complete search history.

(56) References Cited

U.S. PATENT DOCUMENTS

| 5,063,288 A | 11/1991 | Hsu et al. |
| 5,093,879 A * | 3/1992 | Bregman et al. ............ 385/93 |
| 5,949,584 A * | 9/1999 | White et al. ................ 359/633 |
| 6,294,777 B1 | 9/2001 | Shteynberg et al. |
| 2001/0040213 A1 | 11/2001 | Shteynberg et al. |
| 2005/0111236 A1* | 5/2005 | Hulse ......................... 362/555 |

FOREIGN PATENT DOCUMENTS

| DE | 2613866 A1 | 10/1977 |
| DE | 4334785 C2 | 5/1994 |
| DE | 19712828 A1 | 10/1998 |
| EP | 0369386 B1 | 5/1990 |
| EP | 0959371 A2 | 11/1999 |
| EP | 1160697 A1 | 2/2002 |
| EP | 1344973 A2 | 9/2003 |
| EP | 1420271 A2 | 5/2004 |
| EP | 1420271 A3 | 5/2004 |
| EP | 1439404 A2 | 7/2004 |

* cited by examiner

*Primary Examiner*—Sung Pak
(74) *Attorney, Agent, or Firm*—Townsend and Townsend and Crew

(57) ABSTRACT

A strip-like housing of a light grid has two side walls that extend over its entire housing length and that are joined together by cross braces. The cross braces form a honeycomb structure, in which the transmitting and receiving elements of the light grid are installed.

15 Claims, 4 Drawing Sheets

LIGHT BARRIER

BACKGROUND OF THE INVENTION

The invention concerns a light barrier or grid with transmitting and receiving units longitudinally arranged at intervals in a strip-like housing, each of them including an optoelectronic element that is spaced apart from at least one optical function element.

Light grids are extensively used for the recognition and monitoring of objects on conveyor belts, for baggage inspection on conveyor belts, for controlling elevator doors, for protecting body parts at machine tools, for access control of people and vehicles, etc. The light grids have spaced-apart transmitting units arranged in a strip-like housing and receiving units arranged in a strip-like housing with a corresponding spacing. The transmitting units emit light beams, typically infrared light, which impinge on the receiving units. Interruptions of the light beams are detected and evaluated.

The transmitting units and the receiving units each include an optoelectronic element and an optical function element placed at a distance from the former in the direction of the beam. At the transmitting unit, an optoelectronic transducer emits light which is focused onto the corresponding receiving unit by the optical function element, for example a lens or a diaphragm. The receiving unit has a corresponding optical function element which directs the light at an optoelectronic transducer.

The optoelectronic elements and the corresponding optical function elements of the individual transmitting and receiving units are mounted in a housing, and they must be aligned relative to each other and relative to the housing. For this, it is known to assemble the particular optoelectronic elements and the corresponding optical functions elements, for example, by means of a tube, to form a subassembly in which the optoelectronic elements and the optical function elements are properly oriented and aligned in respect to each other. The subassemblies are installed in the housing, and they then have to be oriented in relation to the housing. The mounting of the optoelectronic elements and the optical function elements to form the subassembly and the mounting of the subassembly in the housing result in an addition of the individual assembly tolerances.

It is known to configure the housing as a U-shaped profile in which the subassemblies are inserted from the open front end and clipped in place. Such a U-shaped housing has a relatively low torsional rigidity. Improving the torsional rigidity, especially in the case of an extruded plastic profile, requires larger material cross-sections and/or expensive materials.

It is also known to use an enclosed, hollow profile for the housing. In this case, the subassemblies have to be longitudinally pushed into the housing from an open end of the profile. This is cumbersome, especially when the housing is relatively long and makes it difficult to accurately orient and align the subassemblies relative to the housing. If an extruded profile is used, machining is also necessary, which increases manufacturing costs.

The use of trough-shaped plastic housings is also known. They enable an easy mounting of the subassemblies. Such housings, however, require additional metal reinforcements to provide the needed stability and adjustability.

SUMMARY OF THE INVENTION

It is therefore an object of the present invention to provide a light grid which is easy to assemble with a high degree of precision and at relatively low cost.

This object is attained by providing cross braces in the empty space of the housing between the respective transmitting and receiving units which join together the side walls of the housing. The cross braces result in a high flexural and torsional rigidity of the housing. The optoelectronic elements and the optical function elements can be mounted directly in the housing, preferably by utilizing the cross braces to orient the optoelectronic elements and the optical function elements relative to each other. This reduces installation tolerances and improves alignment and adjustment accuracy. The installation, moreover, is easy, because the optoelectronic elements can be inserted into the housing from the back side thereof and the optical function elements from the front side. This is particularly advantageous because it results in only one installation direction, namely perpendicular to the longitudinal axis of the housing. Misalignments due to temperature expansions are also reduced.

Another important advantage of the invention is that the cross braces function as a light tube between the optoelectronic elements and the optical function elements. This eliminates a considerable number of structural parts that would otherwise be needed. Housings constructed in accordance with the present invention have not only a mechanical function, but also an optical one because the cross braces prevent the optoelectronic transmitting elements from emitting light sideways at the transmitting unit and prevent scattered light from reaching the receiving elements at the receiving unit.

For this, the cross braces are preferably configured as substantially continuous, closed cross walls.

It is especially advantageous if two intersecting cross braces are arranged between adjacent transmitting or receiving units. The intersecting cross braces provide the housing with a high degree of rigidity. Furthermore, the intersecting cross braces form a simple honeycomb structure which fulfills the function of a light tube in an especially simple and efficient manner.

A simple assembly of the light grid is attained when the optoelectronic elements and/or the optical function elements are arranged on or configured as continuous strips, webs or plates. The strips, webs or plates are arranged at the front side of the housing in front of and at the back side of the housing behind the cross braces. At the front side, the housing is closed with a continuous front glass pane, while the back end of the housing can be closed by a continuous housing bottom.

In another embodiment of the invention, the length of the grid is variable by using a modular construction which allows several housings to be fitted together to obtain a light grid of the desired length.

The assembly is simplified and an accurate alignment of the housings is achieved by using a dovetail joint to fit the housings together. Further, an electrical connection between the housings can be simultaneously established with the mechanical connection.

DESCRIPTION OF THE PREFERRED EMBODIMENTS

The housings at the transmitting end and the receiving end of the light grid are the same. The only difference is that different optoelectronic elements and the optical function elements are used at the transmitting end and the receiving end to perform their different functions.

Housing 10 is a one-piece plastic part, which is preferably injection molded. The housing has the shape of an elongated strip or bar which has brackets, for example, for mounting the housing to a place of installation.

Figure 1:
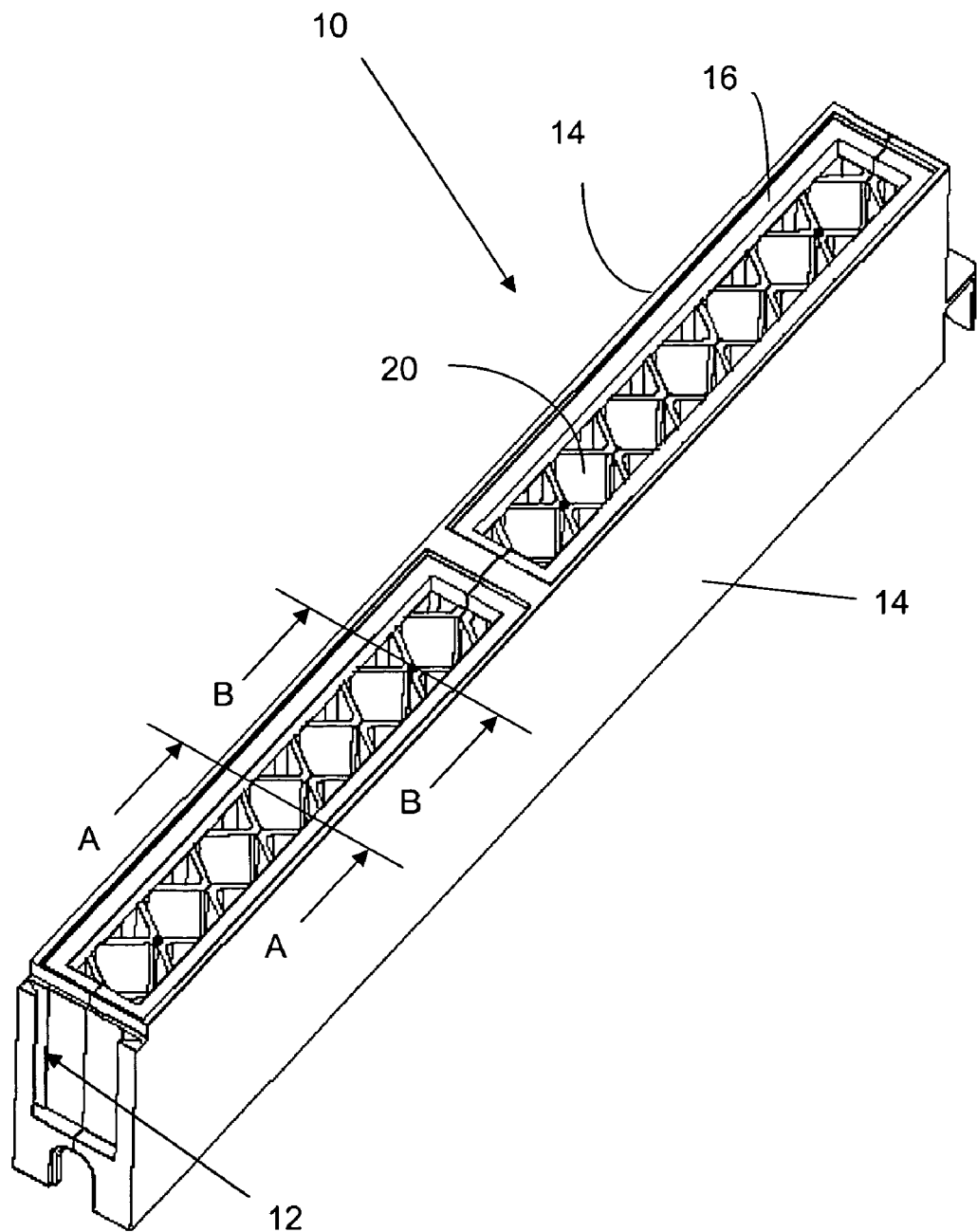
FIG. 1 is a perspective front view of a housing constructed in accordance with the present invention.
Figure 2:
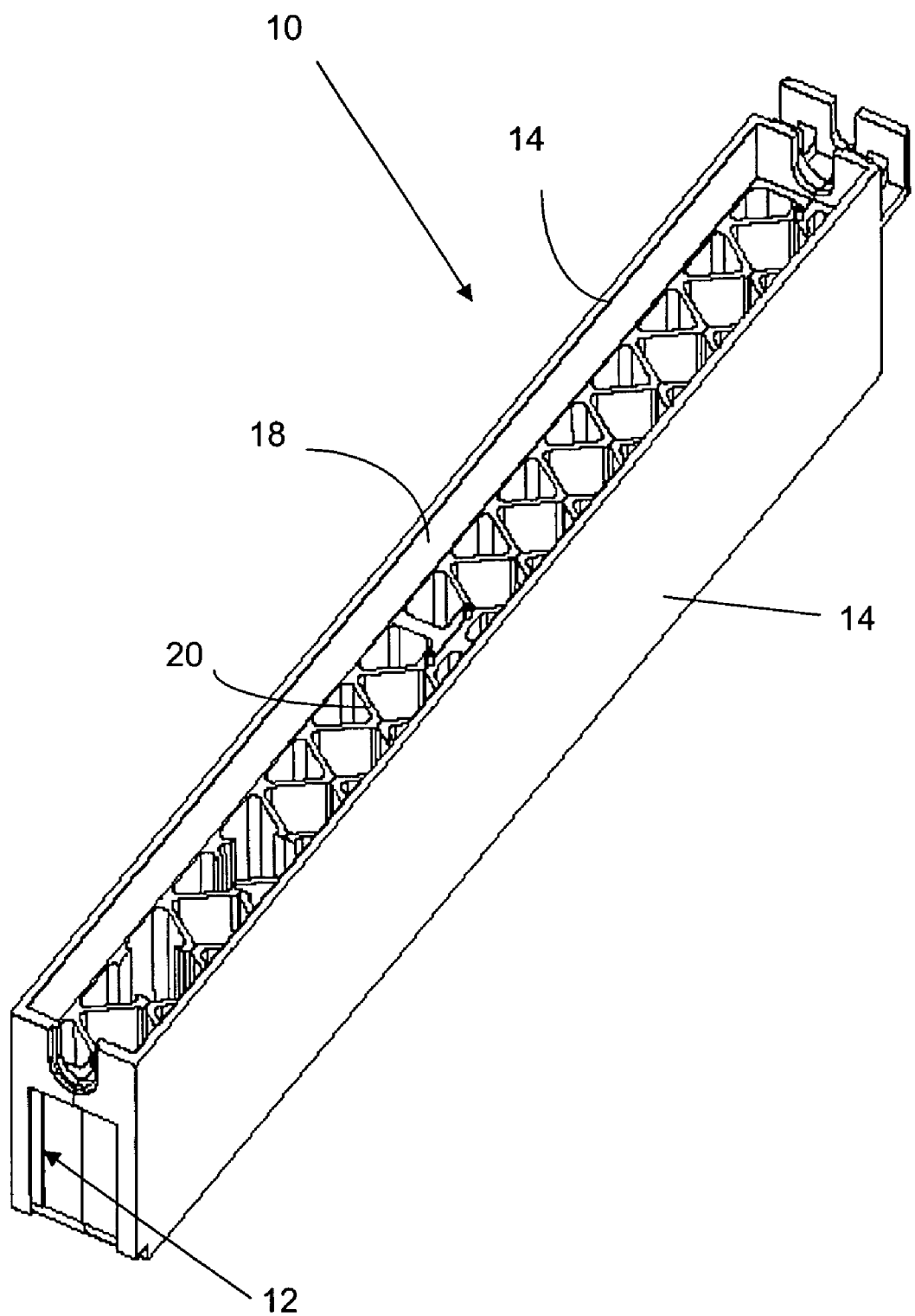
FIG. 2 is a perspective rear view of the housing.
Figure 3:
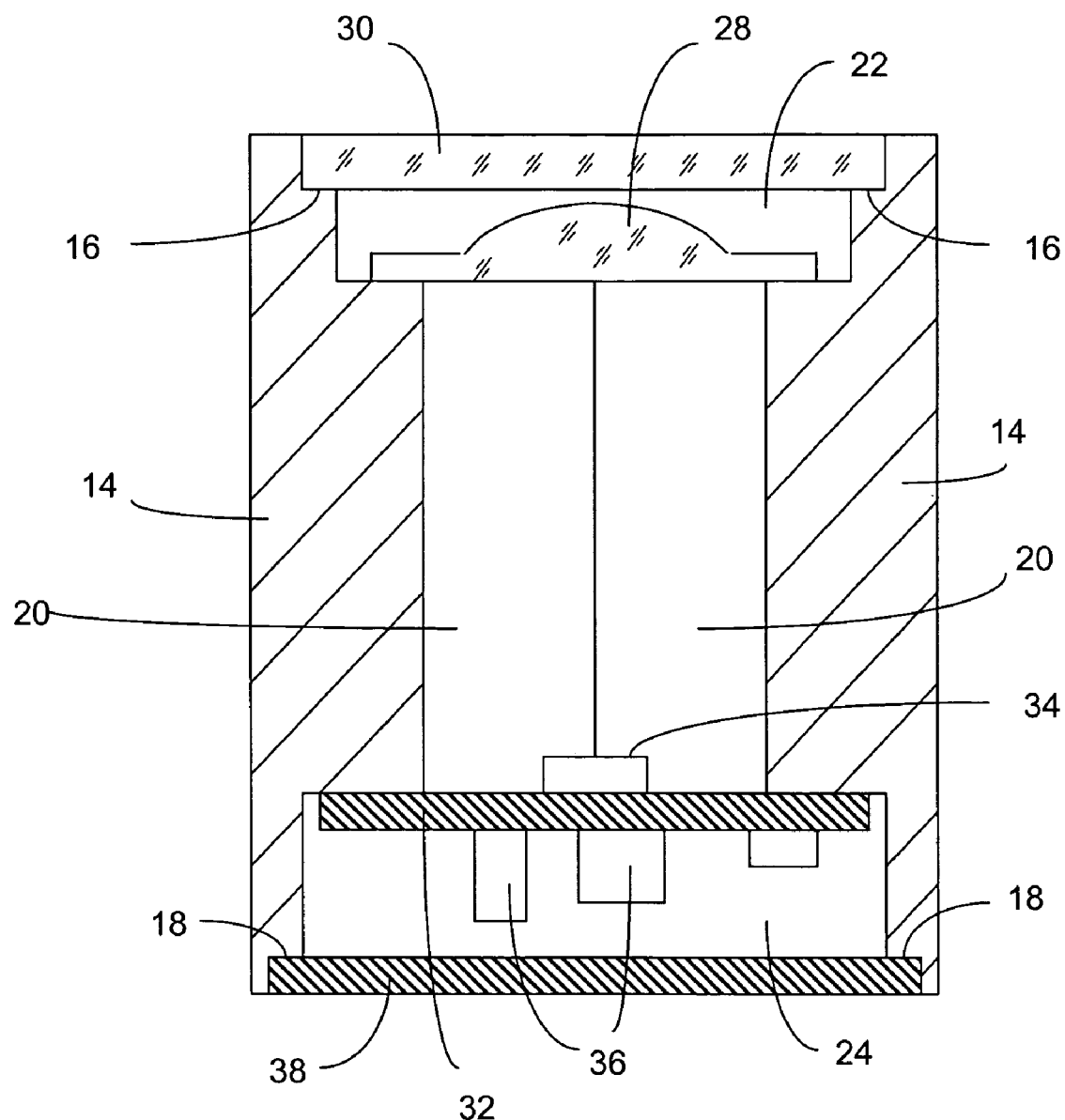
FIG. 3 is a section through the assembled light grid taken along line A—A of FIG. 1.
Figure 4:
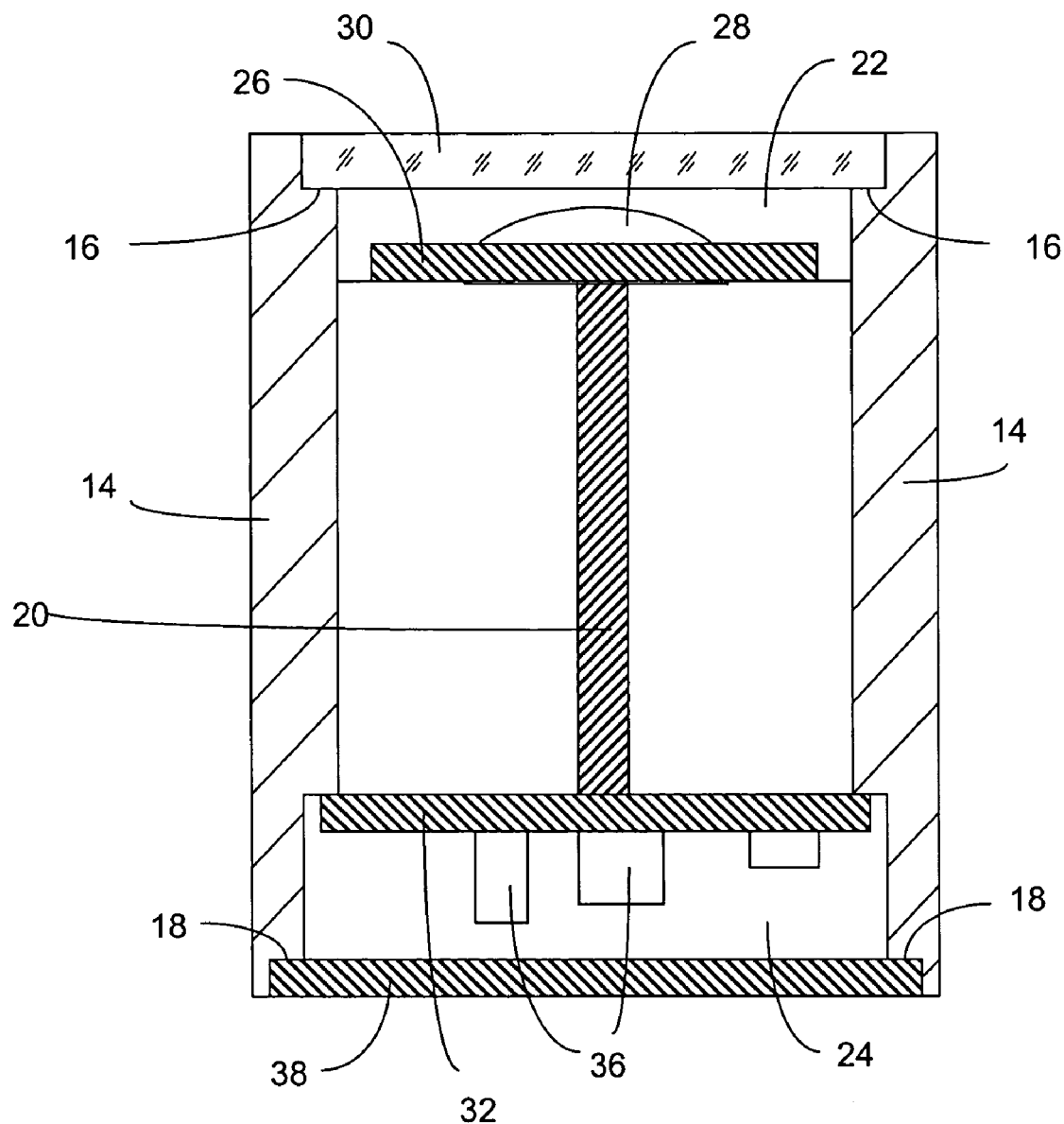
FIG. 4 is a section through the assembled light grid taken along line B—B of FIG. 1.

Housing 10 has two closed side walls 14 that are continuous in the longitudinal direction of the housing. The height of the side walls 14 corresponds to the overall structural height of the housing. The housing 10 is closed at its end faces, as is shown in FIGS. 1 and 2. The housing can be provided with a dovetail connection 12 at one end surface, as is shown in FIGS. 1 and 2. Two or more housings can be joined axially flush when the light grid requires a greater length. In such a case, the dovetail connection 12 forms a stable mechanical connection. In addition, an electrical connection (not shown in the drawings) can simultaneously be established when the mechanical connection is made. For this, corresponding contact surfaces (not shown) are arranged at the end faces of the housings being connected.

At their front-side edge, side walls 14 have an inner step 16, and at their back side edge they have another inner step 18. Side walls 14 are joined together by intersecting cross braces 20 which are uniformly spaced along the length of the side wall. Cross braces 20 are configured as continuous, closed cross walls which are angularly inclined, preferably by about 45°, relative to side walls 14. Thus, cross braces 20 intersect at a mid-point between the side walls 14 and they are angularly inclined relative to each other by about 90°. The cross braces 20 define a honeycomb that forms tubular structures of a somewhat square cross-section which are equally spaced over the length of housing 10. The spacing between the honeycomb cells defined by cross braces 20 corresponds to the spacing of the transmitting and receiving elements of the light grid strips and, thus, to the spacing between the light beams of the light grid.

The height of cross braces 20 is less than the height of side walls 14, resulting in a front seating space 22 at the front side and a back seating space 24 at the back side of the housing. The seating spaces 22 and 24 are respectively formed by the front and rear edges of the cross braces 20. The side walls 14 are open toward the front side of the housing and the rear side of the housing, respectively.

A continuous strip 26 is placed and properly aligned in front-side seating space 22. The strip can be aligned with pegs (not shown) that project from the cross braces and onto which the strip 26 is mounted. Strip 26 can be made of a rigid or flexible material and supports optical function elements 28, such as lenses or diaphragm apertures. Strip 26 is preferably made from plastic, and function elements 28 are configured as an integral, one-piece part of the strip. The optical function elements 28 are arranged on strip 26 in the gridwork of honeycomb cells formed by the cross braces 20. The strip is adjusted so that optical function elements 28 are coaxially aligned with the center axes of the honeycomb cells. The front-side seating space 22 is closed by a transparent front cover 30, such as a glass pane, which extends over the entire length of housing 10, is inserted into front-side step 16 of the side walls 14, and is secured therein.

A continuous electronic circuit board 32 is inserted and properly oriented in rear-side seating space 24. The circuit board is aligned in the same way as the strip 26. Circuit board 32 carries optoelectronic elements 34 on its front surface; e.g. at the transmitting side it carries semiconductor elements emitting light and at the receiving side it carries photoelectrical semiconductor elements or transducers that detect light. The optoelectronic elements 34 are arranged in the cell spaces of the honeycombs formed by the cross braces 20. The electronic board 32 is oriented in the housing so that optoelectronic elements 34 are coaxially aligned with the honeycomb cells and the corresponding optical function elements 28. Electronic components 36 are arranged on the rear side of board 32 and are electrically connected to optoelectronic elements 34. The rear-side seating space 24 is closed by a housing bottom 38. The housing bottom extends over the entire length of the housing 10, is inserted in rear-side step 18 of the side walls 14, and is suitably secured to the housing.

What is claimed is:

1. A light grid for generating a plurality of spaced-apart, parallel radiation beams comprising a first housing defining a transmitting unit and a second housing defining a receiving unit for detecting an object passing between the housings when the object crosses at least one of the beams, each housing having an open front side facing the other housing and an aft side facing away from the other housing, spaced-apart housing sides extending over the length of the housing, a plurality of intersecting spaced-apart bracing walls connecting the housing side walls to each other and forming open-ended passages that extend from the front side of the housing to the aft side of the housing, the bracing walls substantially preventing radiation transmissions between the passages, a radiation source for generating a radiation beam and a first optical element optically aligned with the source arranged in the first housing for directing the radiation beam from the source past the first optical element directly to the second housing in at least preselected ones of the open-ended passages, and a radiation receiver and a second optical element optically aligned with the receiver arranged in the second housing for receiving the radiation beam directly from the first housing in preselected ones of the open-ended passages in the second housing which correspond to the preselected open-ended passages in the first housing so that, upon activation of the radiation source, the radiation beams extend from the first housing to the second housing and an interruption of at least one of the radiation beams by the object is detected by the radiation receiver.

2. A housing according to claim 1 wherein the bracing walls are configured as substantially continuous cross walls.

3. A housing according to claim 2 wherein the bracing walls have a height that substantially corresponds to a distance between the source and the receiver and the first and second optical elements, respectively.

4. A housing according to claim 1 wherein the bracing walls intersect and define a honeycomb structure.

5. A housing according to claim 1 including a continuous transparent plate covering the front side of each first and second housing and positioned in front of the bracing walls in the direction of the radiation beams.

6. A housing according to claim 1 including a continuous strip in front of the bracing walls of the first and second housings, and wherein the respective first and second optical elements are arranged on the strip.

7. A housing according to claim 1 including a continuous housing bottom plate attached to and closing a rear side of the first and second housings.

8. A housing according to claim 1 including an electronic circuit board behind the bracing walls of the first and second housings in the direction of the radiation beams, and wherein the optical elements are arranged on the circuit boards.

9. A housing according to claim 1 wherein the side walls and the bracing walls comprise a single plastic piece.

10. A housing according to claim 1 wherein a plurality of respective first and second housings are fitted together.

11. A housing according to claim 10 wherein the plurality of respective first and second housings define a dovetail connection between them for aligning and connecting adjacent housings to each other.

12. A housing according to claim 11 wherein closure of the dovetail connection also establishes an electrical connection between the first housings and between the second housings.

13. A light grid for generating a plurality of spaced-apart, parallel radiation beams comprising first and second, spaced-apart, aligned housings, the radiation beams extending between the housings, each housing having an open front side facing the other housing and an open aft side facing away from the other housing; parallel, spaced-apart housing sides extending over the length of the housing and terminating at front and rear sides of the housing; a multiplicity of closed, spaced-apart bracing walls connecting the housing side walls to each other and forming open-ended passages that extend from the front side of the housing to the rear side of the housing and which are spaced apart by respective bracing walls; and an optically aligned set of an optical function element and an optoelectronic element arranged in at least preselected ones of the open-ended passages so that the optical function elements direct the radiation beams between the housings onto corresponding optoelectronic elements.

14. A light grid according to claim 13 wherein the bracing walls are formed by first and second, angularly offset bracing wall sections.

15. A light grid according to claim 14 wherein the bracing wall sections are angularly inclined with respect to each other and with respect to the housing side walls by about 45°.

* * * * *